United States Patent [19]

Takeuchi

[11] Patent Number: 5,230,238

[45] Date of Patent: Jul. 27, 1993

[54] KNOCK SENSING APPARATUS

[75] Inventor: Kiyoshi Takeuchi, Yokohama, Japan

[73] Assignee: Nissan Motor Co., Ltd., Yokohama, Japan

[21] Appl. No.: 676,982

[22] Filed: Mar. 29, 1991

[30] Foreign Application Priority Data

Apr. 9, 1990 [JP] Japan .................................. 2-93537

[51] Int. Cl.⁵ .......................................... G01L 23/22
[52] U.S. Cl. ...................................................... 73/35
[58] Field of Search ............................ 73/35; 310/329

[56] References Cited

U.S. PATENT DOCUMENTS

| | | | |
|---|---|---|---|
| 3,151,258 | 9/1964 | Sonderegger et al. | 73/35 |
| 4,382,377 | 5/1983 | Kleinschmidt et al. | 73/35 |
| 4,397,176 | 8/1983 | Rohde et al. | 73/35 |
| 4,517,945 | 5/1985 | Ishigami et al. | 73/35 |
| 4,660,409 | 4/1987 | Miyata et al. | 73/35 |
| 4,686,861 | 8/1987 | Morii | 73/35 |
| 4,903,646 | 2/1990 | Minagawa et al. | 73/35 |

FOREIGN PATENT DOCUMENTS

| | | |
|---|---|---|
| 2917406 | 11/1980 | Fed. Rep. of Germany . |
| 3037835 | 11/1982 | Fed. Rep. of Germany . |
| 3429217 | 2/1986 | Fed. Rep. of Germany . |
| 3620733 | 1/1987 | Fed. Rep. of Germany . |
| 8706781.1 | 9/1988 | Fed. Rep. of Germany . |
| 3813932 | 11/1988 | Fed. Rep. of Germany . |
| 60-4824 | 1/1985 | Japan . |
| 2110302 | 6/1983 | United Kingdom . |

Primary Examiner—John E. Chapman
Attorney, Agent, or Firm—Foley & Lardner

[57] ABSTRACT

The knock sensing apparatus comprises a metallic head gasket having a high vibration transmissibility and tightly sandwiched between a cylinder block and a cylinder head, a knock sensor fixed to the metallic head gasket, and a knock detecting circuit. Therefore, vibration of the cylinder block can be more effectively transmitted from each of plural combustion chambers of a multicylinder engine to the knock sensor via the metallic head gasket, at almost the same vibration level, and preferably in the form of longitudinal vibration waves therethrough, as compared with when knock vibration is transmitted through the cylinder block made of material with low vibration transmissibility.

22 Claims, 12 Drawing Sheets a: HIGH CARBON FLAKE GRAPHITE CAST IRON (AUSTENITE BASED)
b: FLAKE GRAPHITE CAST IRON (FL-10)
c: FERRITE-BASED STAINLESS STEEL
d: GLOBULAR GRAPHITE CAST IRON (PERLITE BASED)
e: MALLEABLE CAST IRON (PERLITE BASED)
f: 0.95 % C STEEL
g: 0.45 % C STEEL
h: 18-8 STAINLESS STEEL
i: 0.80 % C STEEL
j: 0.65 % C STEEL
k: Ti ALLOY

FIG. 7

HEAT RESISTANCE (TEMP)

| | MAX. TEMPERATURE | |
|---|---|---|
| | °F | °C |
| LEAD | 121 | 100 |
| BRASS | <u>500</u> | 260 |
| COPPER | 600 | 315 |
| ALUMINIUM | 800 | 425 |
| STAINLESS STEEL 304 | <u>1000</u> | 540 |
| ″ 316 | 1000 | 540 |
| PURE (SOFT) IRON | 1000 | 540 |
| TITANIUM | 1000 | 540 |
| STAINLESS STEEL 502 | 1150 | 620 |
| ″ 410 | 1200 | 650 |
| SILVER | 1200 | 650 |
| NICKEL | 1400 | 760 |
| MONEL | 1500 | 810 |
| STAINLESS STEEL 309 SCB | 1600 | 870 |
| ″ 321 | 1600 | 870 |
| ″ 347 | 1600 | 870 |
| INCONEL | 2000 | 1100 |
| HASTELLOY | 2000 | 1100 | ns
KNOCK SENSING APPARATUS

BACKGROUND OF THE INVENTION

1. Field of the Invention

The present invention relates to a knock sensing apparatus, and more specifically to a knock sensing apparatus for detecting knock vibrating of a multicylinder engine.

2. Description of the Prior Art

FIGS. 1A and 1B show a prior-art knock sensing apparatus disclosed in Japanese Published Unexamined Patent Appli. No. 60-4824, by way of example. In the drawings, a cylinder block 1 is formed with a cylinder 2, and a piston 3 is slidably fitted into the cylinder 2. On top of the cylinder block 1, a cylinder head 4 is so disposed as to form a combustion chamber 5 in cooperation with the cylinder block 1, the piston 3 and the cylinder head 4. The cylinder head 4 is formed with an intake passage 7 communicating with the combustion chamber 5 via an intake valve 6. An ignition plug 8 is attached to the cylinder head 4 to ignite a mixture within the combustion chamber 5 of a multicylinder engine, for instance.

Further, a knock sensor 9 is attached to the cylinder block 1 to detect knock vibration generated in each combustion chamber 5. The knock sensor 9 is connected to a knock detecting circuit 9. A including a bandpass filter 10, a comparator 11, a rectifier 12, a smoothing circuit 13 and an integrator 14. The knocking sensor 9 transduces engine knock vibration into an electric knock signal corresponding thereto; the bandpass filter 10 passes only the knock component signal of about 15 kHz; the rectifier 12 rectifies the bandpassed knock signal into a pulsating signal; and the smoothing circuit 13 smoothes the rectified pulsating signal to a dc signal. The output of the bandpass filter 10 is directly connected to a first input terminal of the comparator 11, but to a second input terminal of the comparator 11 via the rectifier and the smoothing circuit 13. Therefore, where no knock vibration is detected by the knock sensor 9, the comparator 11 outputs no output signal, because the signal levels of the two input terminals of the comparator 11 are almost the same; however, where knocking vibration is detected, the comparator 11 outputs a knock signal of a predetermined voltage level, because there exists a difference in signal level between the first and second input terminals of the comparator 11. The knock signal is integrated by the integrator 14, so that a knock signal whose voltage level varies according to the frequency of knock vibration is applied to an ignition circuit 15. The ignition circuit 15 controls ignition timing of the ignition plug 8 in accordance with the voltage level of the knock signal obtained through the integrator 14 in such a way that ignition timing is delayed whenever knock vibration is generated.

The structure of the knock sensor 9 is disclosed in detail, for instance, in Japanese Published Unexamined Utility Model Appli. No. 1-134229, as shown in FIG. 1(C). In the drawing, a casing 16a of the knock sensor 9 is formed with a tapered threaded portion 16a so as to be screwed into a threaded hole of the cylinder block 1. On the other hand, a pair of piezoelectric elements 17 are housed within the casing 16 and fixed to the casing 16 via a weight member 18 with a bolt 19. Since the piezoelectric elements 17 can transduce mechanical energy (knock vibration) to electric energy (knock signal), the transduced knock signal can be obtained through a terminal 120 connected to the piezoelectric elements 17.

In the prior-art knock sensing apparatus as described above, however, since the cylinder block through which knock vibration is transmitted and detected is made of cast iron or aluminium alloy and formed into a complicated shape in order to reduce engine vibration noise (because cast iron or aluminium alloy is low in vibration transmissibility), there exists a problem in that knock vibration generated in each cylinder combustion chamber 5 is reduced during propagation through the cylinder block 1 and therefore knock vibration is not effectively transmitted to the knock sensor 9, so that it is impossible to reliably detect the presence of knock vibration of a cylinder remote from the knock sensor, in particular in the case of a multicylinder engine.

SUMMARY OF THE INVENTION

With these problems in mind, therefore, it is the primary object of the present invention to provide a knock sensing apparatus which can reliably detect knock vibration generated by all the cylinders of a multicylinder engine, irrespective of the arrangement position of the cylinders.

To achieve the above-mentioned object, the present invention provides a knock sensing apparatus for detecting knock vibration of an engine including a cylinder block (20) and a cylinder head (4), comprising: (a) a metallic head gasket (21, 24, 50, 100) having a high vibration transmissibility and tightly sandwiched between the cylinder block and the cylinder head; (b) knock sensing means (22, 24) fixed to said metallic head gasket, for sensing knock vibration of the engine; and (c) knock detecting circuit means (9A) connected to said knock sensing means, for detecting presence or absence of engine knock vibration in response to an output signal of said knock sensing means.

The metallic head gasket is preferably formed of stainless steel because of its high vibration transmissibility, high tensile strength and high heat resistance temperature. The metallic head gasket is preferably provided with an elastic function by bending and folding inner peripheral portions thereof or by placing at least one rubber plate on one surface of the metallic head gasket.

The knock sensing means is attached at substantially the middle of the cylinder block to effectively sense knock vibration from the plural cylinders of a multicylinder engine at almost the same vibration level, preferably in the form of longitudinal vibration wave transmitted through the metallic head gasket along the flat plane direction thereof.

When knock is generated from the engine combustion chamber, the knock is transmitted through the metallic head gasket sandwiched between the cylinder block and the cylinder head, and then sensed by the knock sensing means. The sensed knock vibration is transduced into a knock signal and applied to the knock detecting circuit to detect specific vibration frequency components as an engine knock presence signal. The detected knock presence signal is given to an ignition circuit to adjust ignition timing.

In the knock sensing apparatus according to the present invention, since the head gasket is formed of a metallic material with a high vibration transmissibility and further the knocking sensing means is disposed at the middle of the cylinder block, it is possible to more effectively detect the presence of engine knock transmitted through the head gasket, as compared with when engine knock is transmitted through the cylinder block made of material with low vibration transmissibility, without being subjected to the influence of difference in distance between the knock sensing means and the engine cylinders.

BRIEF DESCRIPTION OF THE DRAWINGS

FIG. 7 is a table listing the heat resistance temperature of various metallic materials;

DETAILED DESCRIPTION OF THE PREFERRED EMBODIMENTS

Figure 1A:
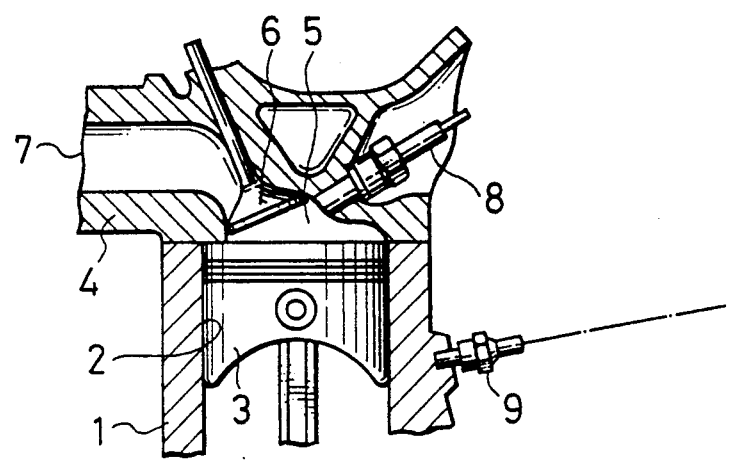
FIG. 1(A) is a partial cross-sectional view showing a prior-art knock sensing apparatus.
Figure 1B:
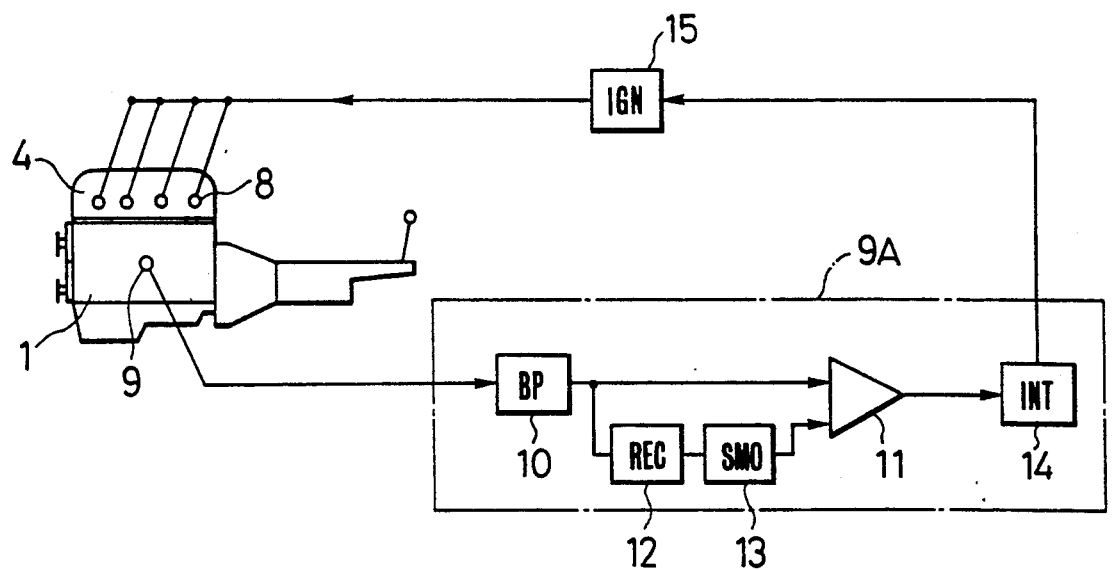
FIG. 1(B) is a schematic block diagram showing a prior-art knock detecting circuit.
Figure 1C:
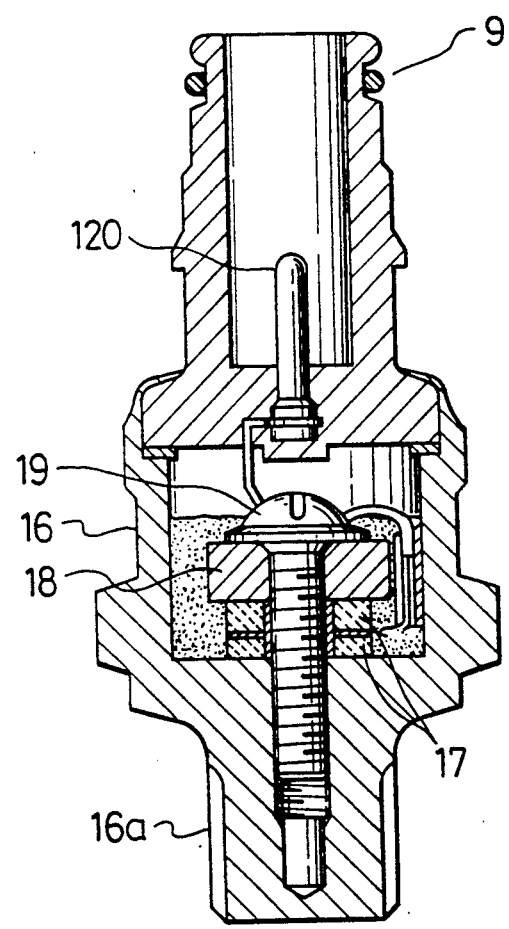
FIG. 1(C) is an enlarged cross-sectional view showing a prior-art knock sensor.

Embodiments of the knock sensing apparatus according to the present invention will be described hereinbelow with reference to the attached drawings:

In the drawings, the similar elements or part which have the same functions and structures as those provided for the prior-art apparatus shown in FIGS. 1(A), 1(B) and 1(C) are denoted by the same reference numerals, without repeating any detailed description of them.

Figure 2A:
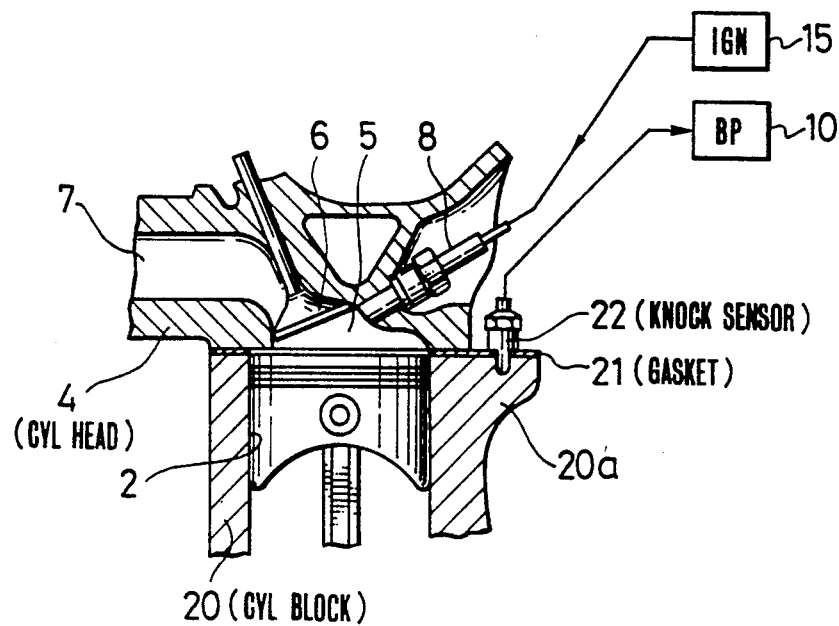
FIG. 2A is a cross-sectional view showing a knock sensing apparatus according to the present invention.

With reference to FIG. 2A, cylinder block 20 of the embodiment is formed with a plurality of hollow cylinder portions 2 (only one is shown in FIG. 2A) and an overhanging portion 20a of the middle portion of the top surface thereof so as to expand in the transversal direction of the cylinder block 20. A cylinder head 4 is disposed on top of the cylinder block 20 with a head gasket 21 sandwiched between the two. This head gasket 21 is made of a flat metallic material of high vibration transmissibility, for instance such as 18-8 stainless steel (SUS 304 in Japanese Industrial Standard).

Figure 3A:
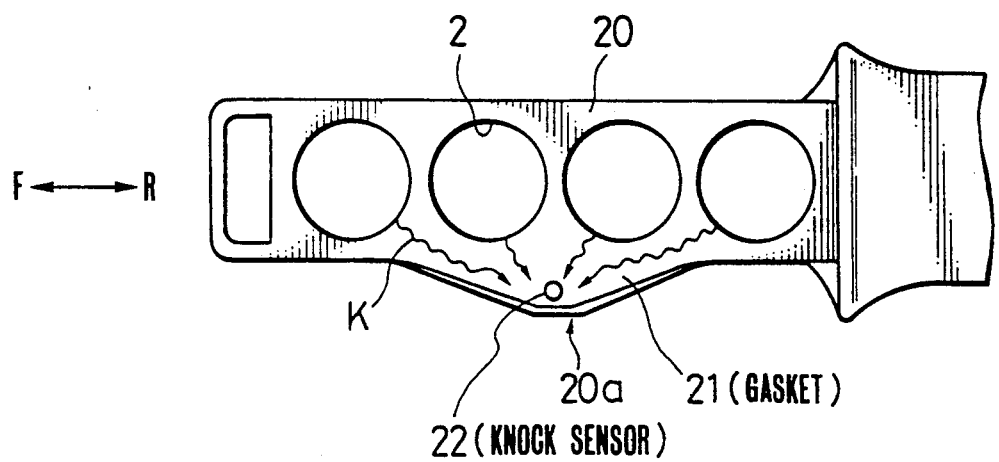
FIG. 3A is a top view showing a cylinder block to which a first embodiment of the knock sensing apparatus according to the present invention is fixed via a metallic head gasket.
Figure 3B:
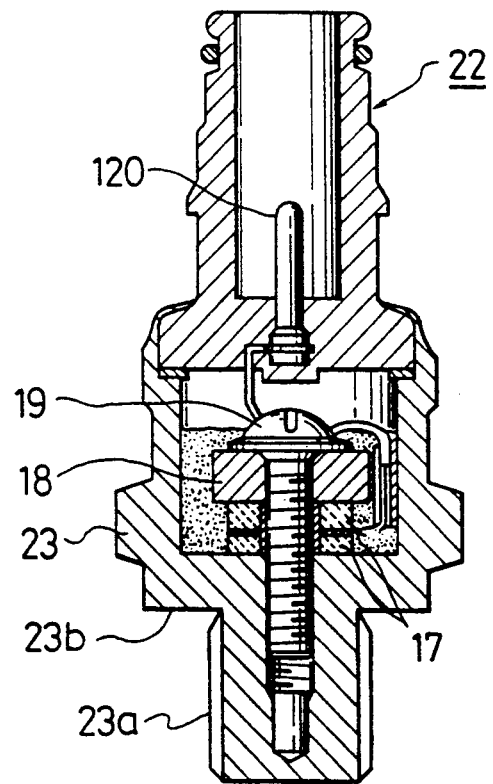
FIG. 3B is an enlarged cross-sectional view showing the knock sensor shown in FIG. 3A.

A knock sensor 22 is attached to the cylinder block via the metallic head gasket 21 at the middle of the overhanging portion 20a of the cylinder block 20, as shown in FIG. 3A. As shown in FIG. 3B, a knock sensor 22 is formed with a threaded portion 23a and a shoulder portion 23b being different from the prior-art knock sensor 9 shown in FIG. 1C. The threaded portion 23a is screwed into a threaded hole formed at the middle of the overhanging portion 20a, and the shoulder portion 23b is brought into pressure contact with the upper surface of the overhanging portion 20a via the head gasket 21, in order to detect knock vibration generated in each combustion chamber 5 of a multicylinder engine having four cylinders, for instance as shown in FIG. 3A.

Figure 2B:
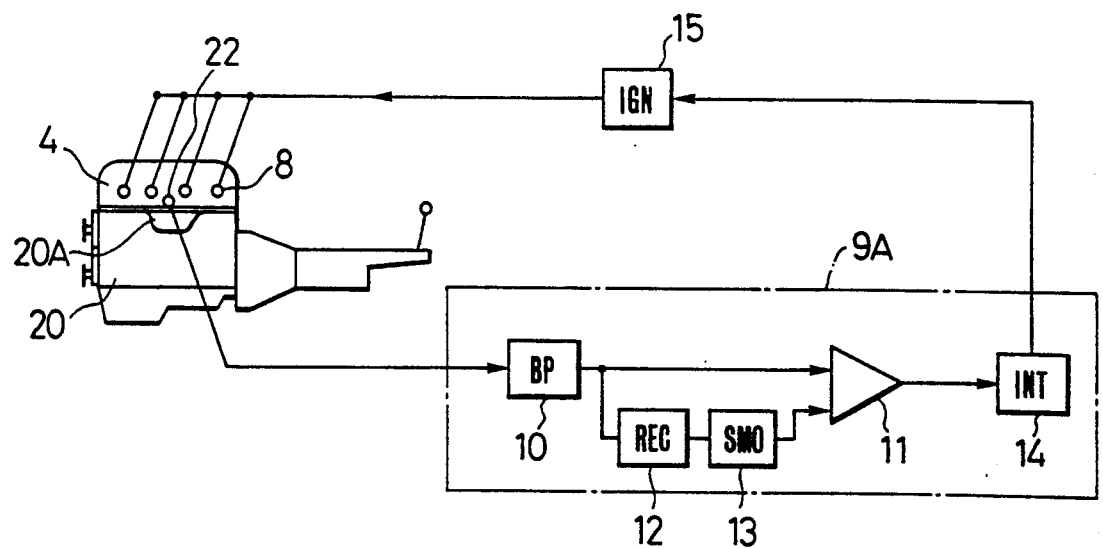
FIG. 2B is a schematic block diagram showing a knock detecting circuit according to the present invention.

In the same way as in the prior-art apparatus, the knock sensor 22 is connected to a knock detecting circuit 9A having a bandpass filter 10, a rectifier 12, a smoothing circuit 13, a comparator 11 and an integrator 14, as shown in FIG. 2B. Further, the integrator 14 is connected to an ignition circuit 15 to ignite four ignition plugs 8.

FIG. 3A shows a top view of a four-cylinder block 20, in which a cylinder head 4 is removed. As shown, since the knock sensor 22 is fixed at the middle of the cylinder block and further the width of the head gasket 21 is designed as wide as possible, it is possible to uniformly detect knock vibrations K transmitted from four cylinders 2 to the knock sensor 22.

The operation of the knock sensing apparatus according to the present invention will be described hereinbelow.

When knock is generated within each combustion chamber 5 of each cylinder 2, the generated knock vibration is transmitted radially from the inner circumferential side surface of each hole formed in the metallic head gasket 21 to the outer side surface thereof. Therefore, the transmitted knock vibration K is detected and transduced into an electric signal by the knock sensor 22 fixed to the upper surface of the head gasket 21, and then applied to the knock detecting circuit 9A.

In this embodiment, since the head gasket 21 is made of metallic plate with high vibration transmissibility, the knock sensor 22 can uniformly detect knock vibration K from each cylinder, without being subjected to the influence due to difference in distance between the knock sensor 22 and each cylinder 2. Further, it should be noted that since the head gasket 21 is sandwiched between the cylinder block 20 and the cylinder head 4 both made of material with low vibration transmissibility, various mechanical vibrations generated by the intake/exhaust valves and the crankshaft will not be transmitted to the head gasket 21, so that noise level can be decreased and therefore the S/N ratio of knock vibration can be improved.

Figure 4A:
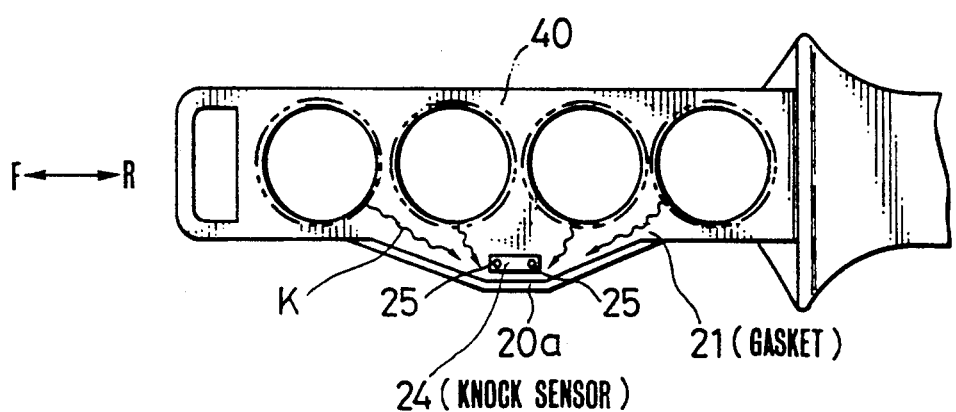
FIG. 4A is a top view showing a cylinder block to which a second embodiment of the knock sensing apparatus according to the present invention is fixed via a metallic head gasket.
Figure 4B:
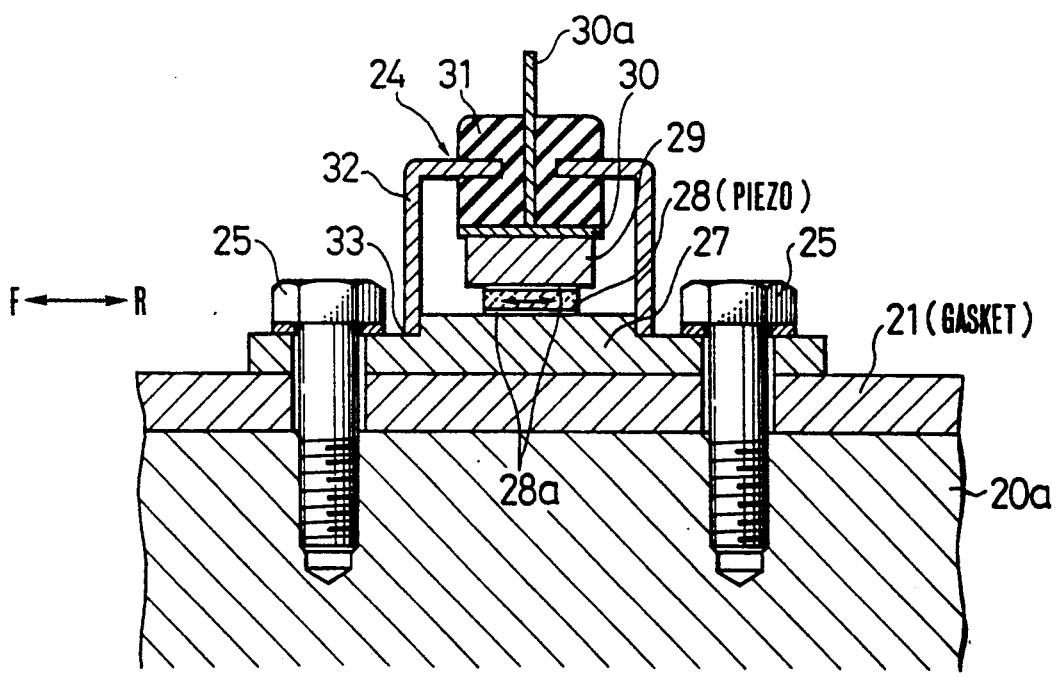
FIG. 4B is an enlarged cross-sectional view showing the knock sensor shown in FIG. 4A.

FIGS. 4A and 4B show a second embodiment of the present invention. FIG. 4A shows a top view of a four-cylinder block 20, in which a cylinder head is removed, and FIG. 4B shows a knock sensor 24 fixed to an overhanging portion 20a of the cylinder block 20. The feature of this embodiment is that the knock sensor 24 is so formed as to effectively sense horizontal vibration along the upper-surface of the cylinder block; that is, the vibration sensitivity direction is determined in the engine front-rear (F-R) direction (in FIG. 4A). In this embodiment, the knock sensor 24 is fixed to the overhanging portion 20a of the cylinder block 20 with two bolts 25 via a base plate 27 and the head gasket 21 both made of stainless steel (e.g. SUS 304).

In more detail with reference to FIG. 4B, the knock sensor 24 includes a piezoelectric element 28 formed with upper and lower electrodes 28a and polarized in the horizontal (F-R) direction, a weight member 29 mounted on the piezoelectric element 28, an electrode plate 30 having a terminal 30a and brought into tight contact with the upper surface of the weight member 29, an elastic bush 31 (e.g. silicon rubber) fixed to the electrode plate 30, and a cylindrical sensor casing 32 for fixing the elastic bush 31 to the base plate 27 so that the lower electrode 28a of the knock sensor 24 is brought into pressure contact with the upper surface of the base plate 27. The upper portion of the sensor casing 32 is fixed to the outer circumferential surface of the elastic bush 31 and the lower portion thereof is welded to the base plate 27. Further, the knock sensor 24 thus constructed is attached to the overhanging portion 20a of the cylinder block 20 by two bolts 25 with the base plate 27 placed on the head gasket 21.

In this second embodiment, since the head gasket 21 is fixed between the cylinder head 4 and the cylinder block 20 and further the piezoelectric element 28 is so polarized as to detect the horizontal component of knock vibration, the knock sensor 24 detects knock vibration K transmitted through the head gasket 21 in the form of longitudinal vibration waves (not transversal vibration waves). In order to effectively detect knock vibration K transmitted to the piezoelectric element 28 via the base plate 27, it is preferable to reduce the weight of the knock sensor 24 itself as much as possible. In this embodiment, since the piezoelectric element 28 is formed thin and disposed extending in the longitudinal (front and rear) direction of the cylinder block 20, it is possible to effectively detect knock vibration transmitted in the horizontal (F-R) direction of the cylinder block through the head gasket 21, in particular the knock vibration transmitted from the cylinders No. 1 and No. 4 arranged the farthest away from the knock sensor 24 at roughly a uniform sensitivity.

Further, in FIG. 4B since the lower surface of the piezoelectric element 28 is brought into pressure contact with the upper surface of the base plate 27 and further the base plate 27 is also in pressure contact with the upper surface of the head gasket 21, the longitudinal vibration waves are effectively transmitted from the cylinder block 20 to the piezoelectric element 28 sandwiched between the weight member 29 and the base plate 27 via the head gasket 21. That is, when acceleration is applied to the piezoelectric element 28 via the head gasket 21 in the horizontal (front and rear) direction, the shearing force is generated between the upper and lower electrodes 28a in the front and rear direction. Therefore, a voltage is generated between the two electrodes 28a due to piezoelectric effect of the element 28 and the generated piezoelectric voltage is detected via the electrode plate 30 and the terminal 30a. The detected voltage is applied to the knock detecting circuit 9A.

Further, since the elastic bush 31 is made of silicon rubber with a predetermined low elasticity as compared with that of the weight member 29 or the piezoelectric element 28, if the bush 31 is brought into tight contact with the weight member 29, vibration motion of the weight member 29 or the piezoelectric element 28 will not be restricted by the elastic bush 31.

Figure 5A:
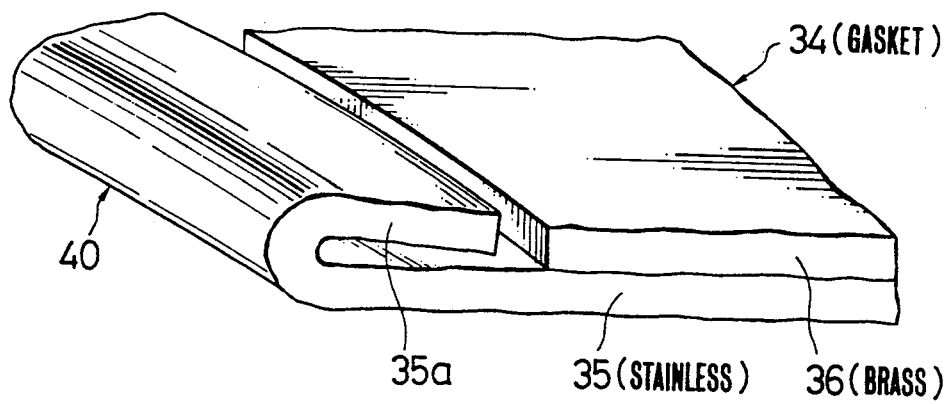
FIGS. 5A, 5B and 5C are partial perspective enlarged views showing three examples of the metallic head gasket adopted to the apparatus of the present invention.

FIG. 5A shows a first modification of the head gasket 34 according to the present invention, in which an inner end 35a of a stainless steel (e.g. SUS 304) plate 35 is bent and folded along the inner circumferential bent line 40 on the combustion chamber (5) side as shown by dot-dot-dashed circles in FIG. 4A and additionally the remaining upper surface of the head gasket 34 is reinforced by an auxiliary metallic (e.g. brass) plate 36. Since the folded portion can be deformed elastically so as to be flush with the auxiliary metallic plate 36 when tightly sandwiched between the cylinder block and the cylinder head, it is possible to obtain a reliable sealing effect when the head gasket 34 is sandwiched between the cylinder block and the cylinder head under a relatively small sealing pressure.

Figure 5B:
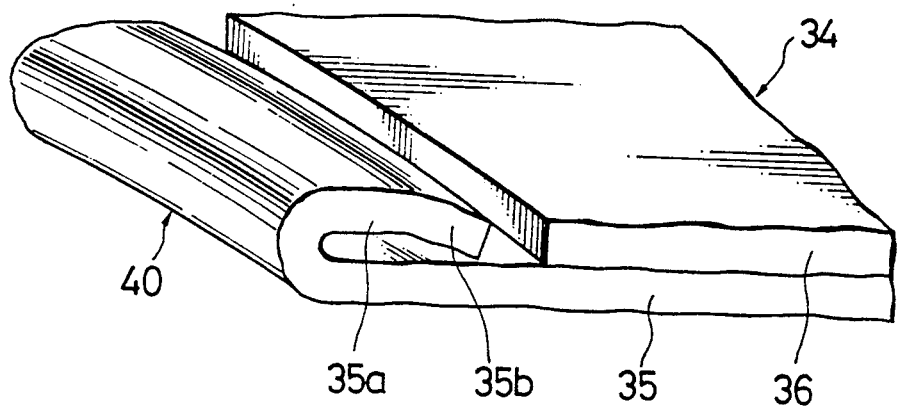

FIG. 5B shows a second modification of the head gasket 34, in which an outermost end 35b of the bent inner end 35a of the folded portion of the stainless steel plate 35 is further bent inwardly so that the folded portion can be deformed in two elastic deformation steps. In this modification, since the tightening force can be applied or divided into the two bent portions 35a and 35b, it is possible to more effectively obtain the sealing effect and further to increase the life time of the head gasket 34 when a high tightening force is applied against the head gasket 34.

Figure 5C:
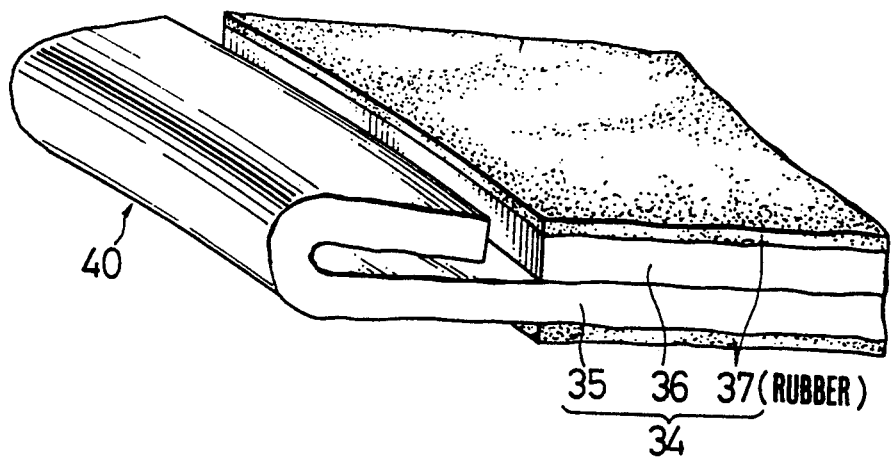

FIG. 5C shows a third modification of the head gasket 34, in which two nonmetallic (e.g. silicon rubber) seal plates 37 are bonded onto both the surfaces of the head gasket 34 composed of the stainless steel plate 35 and the auxiliary metallic plate 36. In this modification, since the sealing characteristic can be further improved and since knock vibration can be effectively transmitted to the knock sensor 24, without being transmitted to the cylinder head 4 and the cylinder block 20 through the nonmetallic seal plates 37, it is possible to further increase the sensitivity of the knock sensor 24.

The material of the head gasket will be described in further detail hereinbelow.

Figure 6:
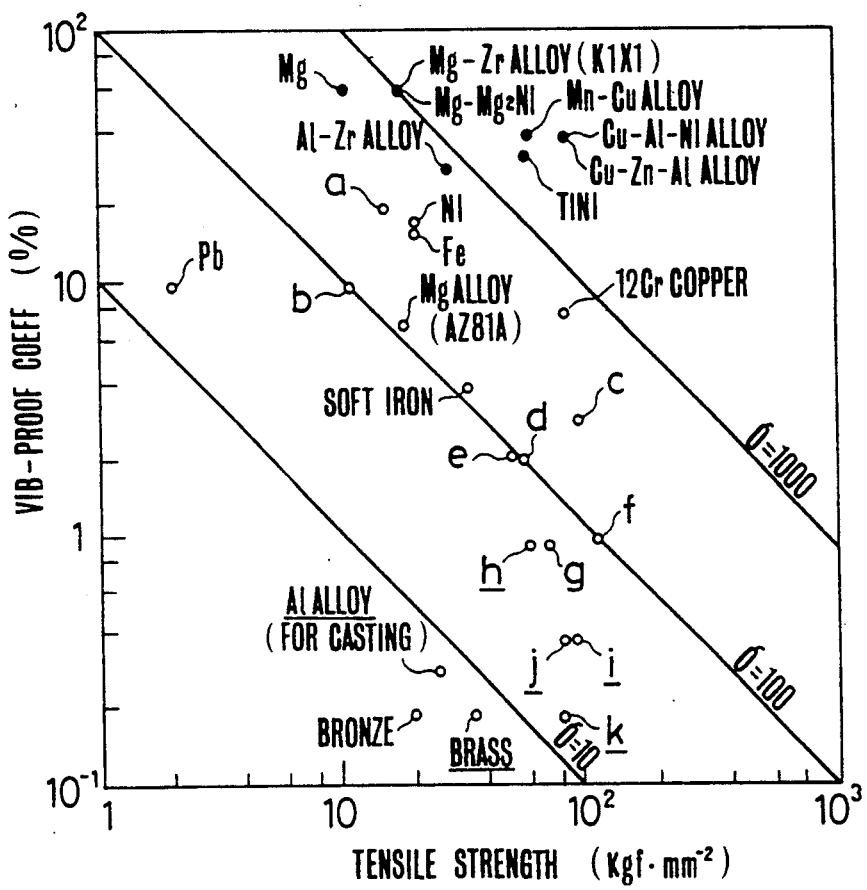
FIG. 6 is a graphical representation showing the relationship between tensile strength and vibration proofing coefficient (opposite to vibration transmissibility) in various metallic materials.

FIG. 6 is a graph showing the relationship between tensile strength (kgf. mm$^{-2}$) and vibration proofing coefficient (%) (opposite to vibration transmissibility) of various metallic material, which is disclosed in Japanese Metal Handbook. As the head gasket, it is preferable to use metal with low vibration proofing coefficient (i.e. high vibration transmissibility) and high tensile strength, for instance such as 18-8 stainless steel, aluminium alloy, titanium alloy or low carbon steel (including about 0.7% carbon).

FIG. 7 is a table listing heat resistant temperature of various metallic material usable as head gasket according to the present invention, which is disclosed in a book "SEALS" 3rd Edition, Machine Design, Published in Mar. 9, 1967. In this table, each upper limit of the temperature at which material is proof against high temperature for many hours is listed under consideration of oxidization temperature, creep temperature, etc.. In this connection, since a large tightening force is required for a flat metallic head gasket, in particular for stainless steel head gasket, a relatively high tensile strength is also required for the head gasket, in addition to the small vibration proofing coefficient (i.e. high vibration transmissibility). Therefore, the requirements for the head gasket according to the present invention are lower vibration-proof coefficient (i.e. large vibration transmissibility), high tensile strength (because a large effective tightening pressure is required), and a higher heat-resistance (because the gasket is located near the engine combustion chamber). Under the above-mentioned considerations, it is particularly preferable to use stainless steel (e.g. SUS 304) as the head gasket. However, in the case of the auxiliary metallic plate 36, since the material is not directly exposed to a high-temperature combustion gas, it is preferable to use brass of low vibration-proof coefficient (i.e. high vibration transmissibility), in spite of a low heat resistant temperature from the economical standpoint.

Figure 8A:
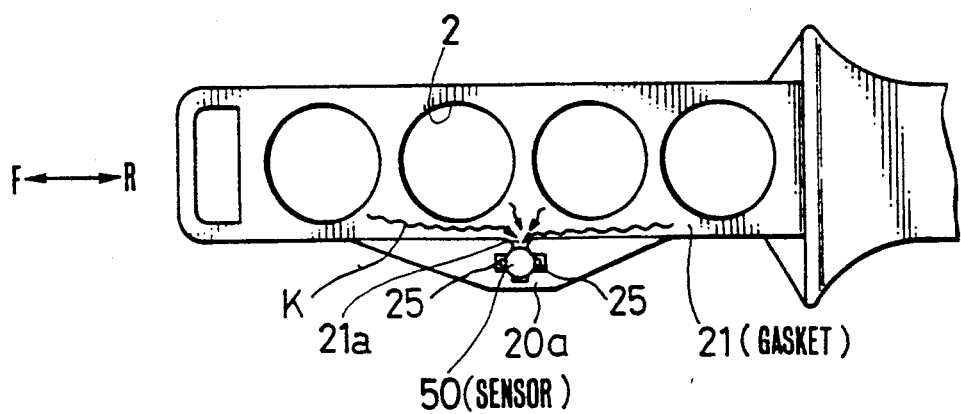
FIG. 8A is a top view showing a cylinder block to which a third embodiment of the knock sensing apparatus according to the present invention is fixed via a metallic head gasket.
Figure 8B:
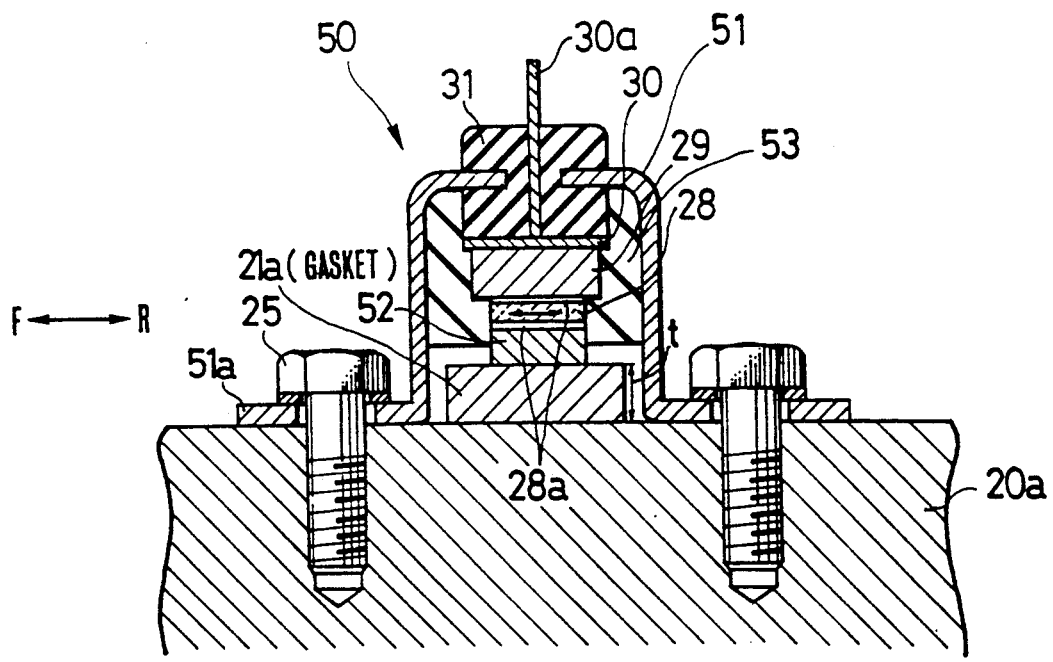
FIG. 8B is an enlarged cross-sectional view showing the knock sensor shown in FIG. 4A.
Figure 8C:
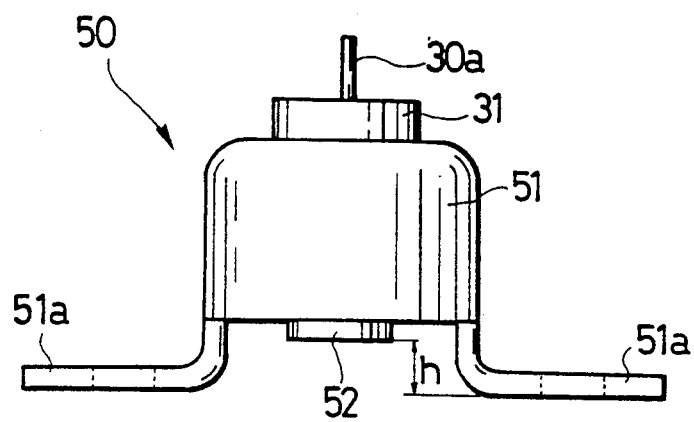
FIG. 8C is an enlarged side view showing the knock sensor shown in FIG. 4A.

FIGS. 8A to 8C show a third embodiment of the present invention. The feature of this embodiment is that the sensor casing 51 is directly fixed to the overhanging portion 20a of the cylinder block 20 by bolts 25 in such a way that a metallic pressure contact member 52 of the knock sensor 50 is urged, from above, against a middle narrow extension portion 21a of the metallic gasket 21. As shown in FIG. 8B, the knock sensor 50 includes a metallic pressure contact member 52, a piezoelectric element 28 formed with two electrodes 28a and polarized in the horizontal (F-R) direction, a weight member 29, an electrode plate 30 formed with a terminal 30a, and an elastic bush 31, which are all stacked in order. The elastic bush 31 is supported by a sensor casing 51, and these stacked elements 52, 28, 29, 30, and 31 are all molded by a molding material 53 (e.g. silicon rubber) within the sensor casing 51 for supporting and waterproofing the sensor elements.

Further, the sensor casing 51 is formed with two flange portions 51a at which the sensor casing 51 is fixed to the overhanging portion 20a of the cylinder block 20 with the bolts 25.

FIG. 8C shows a side view of the sensor 50. With reference to FIGS. 8B and 8C, the distance h between the end surface of the pressure contact member 52 and that of the flange portions 51a is determined slightly smaller than the thickness t of the middle extension portion 21a of the metallic gasket 21, so that the pressure contact member 52 of the knock sensor 50 can be directly brought into pressure contact with the middle extension portion 21a of the metallic gasket 21 under a predetermined pressure, without producing vibration attenuation.

When knock vibration K is generated in the combustion chamber 5, the generated knock vibration K is transmitted through the middle extension portion 21a of the gasket 21 with high vibration transmissibility. Since the knock sensor 50 is disposed over the middle extension portion 21a of the gasket 21 in such a way that only the pressure contact member 52 of the sensor 50 is in pressure contact with the extension portion 21a, it is possible more effectively detect knock vibration via the pressure contact member 52 of the knock sensor 50. Further, since the flange portions 51a of the sensor casing 51 are not in contact with the gasket 21, the mass of the sensor casing 51 will not exert a harmful influence upon the frequency characteristics of the vibration transmission through the metallic gasket 21.

Figure 9A:
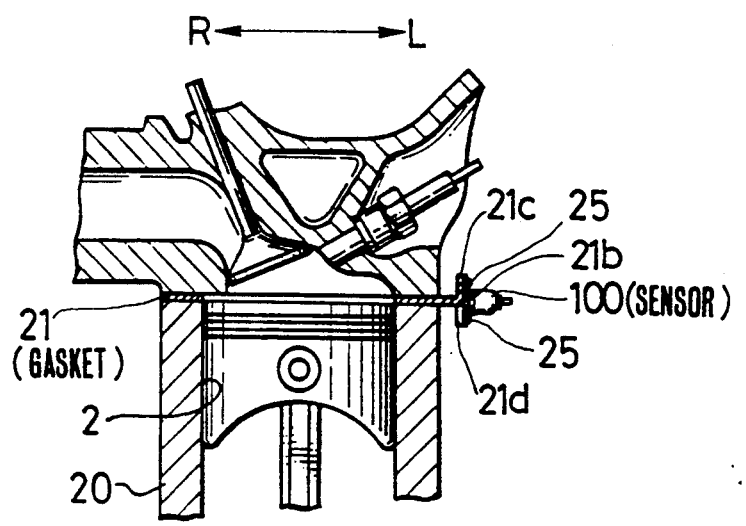
FIG. 9A is a cross-sectional view showing a fourth embodiment of the knock sensing apparatus according to the present invention.
Figure 9B:
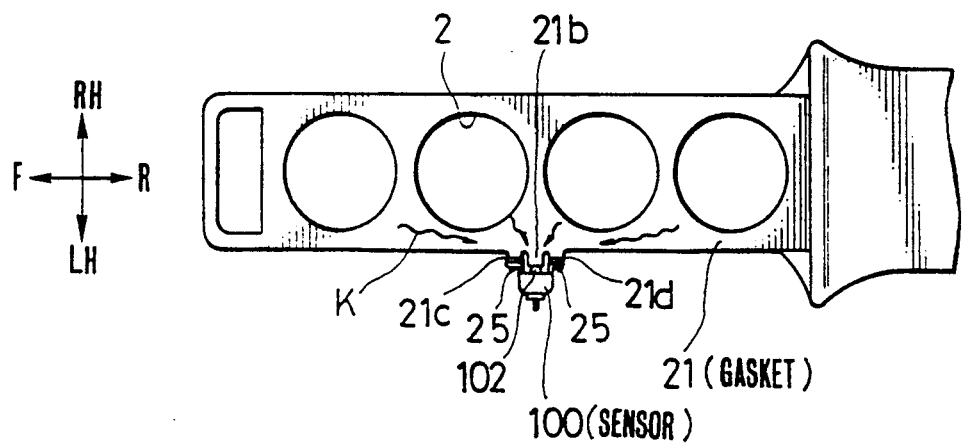
FIG. 9B is a top view showing a cylinder block to which the fourth embodiment of the knock sensing apparatus according to the present invention is fixed via a metallic gasket.
Figure 9C:
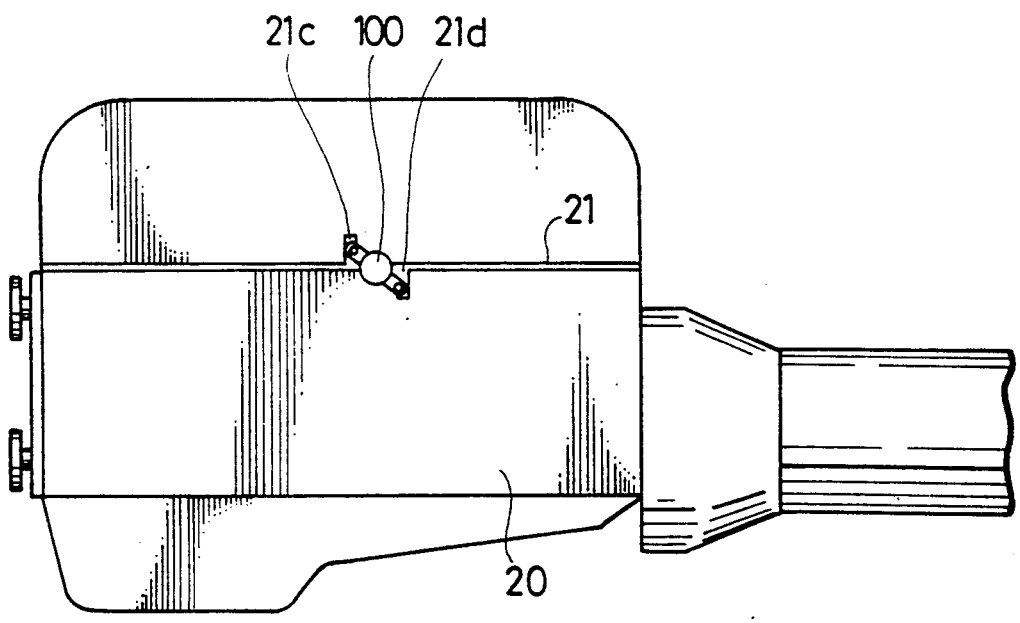
FIG. 9C is a side view showing the same cylinder block shown in FIG. 9B.
Figure 9D:
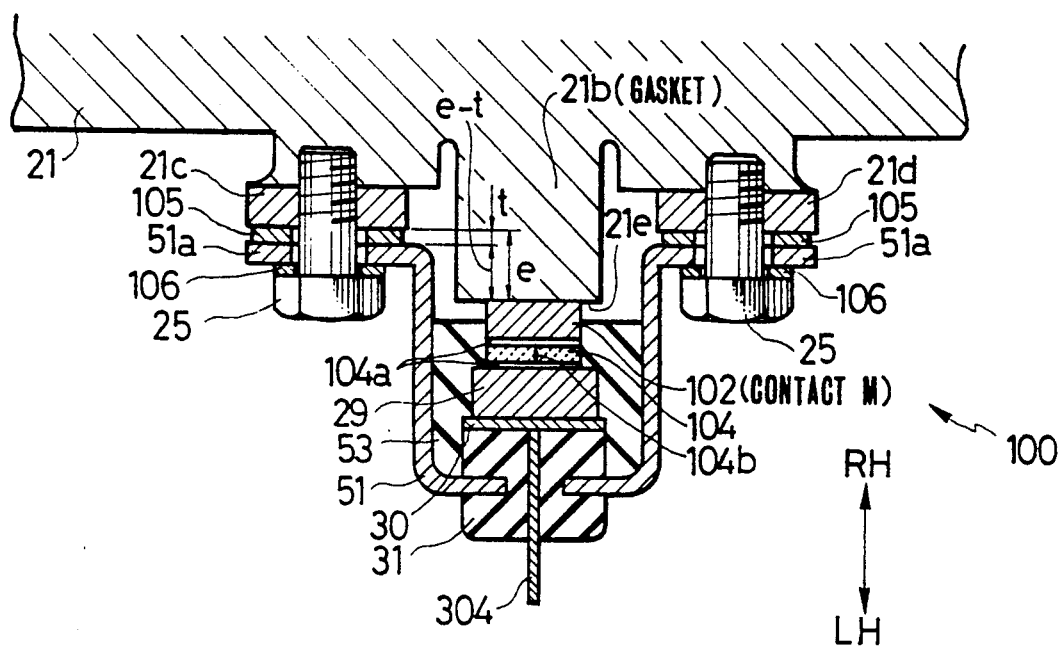
FIG. 9D is an enlarged cross-sectional view showing the knock sensor shown in FIG. 9A.
Figure 9E:
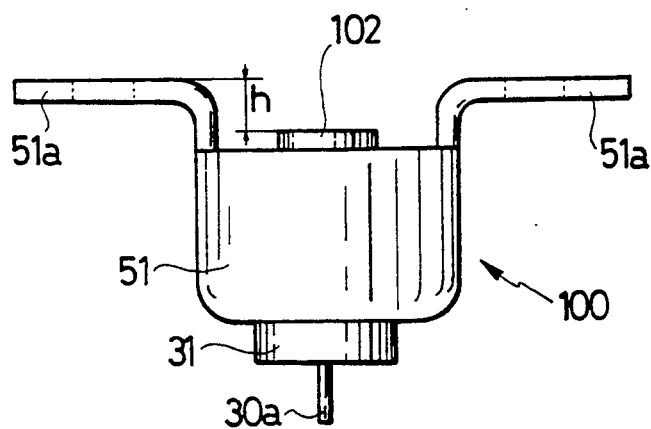
FIG. 9E is an enlarged side view showing the knock sensor shown in FIG. 9A.

FIGS. 9A to 9E show a fourth embodiment of the present invention. The feature of this embodiment is that the vibration sensitivity direction is determined in the engine right and left (RH-LH) direction in FIG. 9B; that is, the knock sensor 100 is fixed to the direction perpendicular to the surface of the metallic gasket 21 as shown in FIG. 9A. That is, the metallic gasket 21 is formed with a middle narrow extension portion 21b and two side vertical flange portions 21c and 21d located on both the sides of the extension portion 21b. Further, the metallic pressure contact member 102 of the knock sensor 100 as shown in FIG. 9E is brought into pressure contact with the middle extension portion 21b of the gasket 21 by fixing the sensor casing 51 to the two side vertical flange portions 21c and 21d of the gasket 21 with bolts 25 as shown in FIG. 9D.

As shown in FIG. 9C, the flange portion 21c is bent upward on the front side and the flange portion 21d is bent downward on the rear side of the engine cylinder block.

As shown in FIG. 9D, the knock sensor 100 includes a metallic pressure contact member 102, a piezoelectric element 104 formed with two electrodes 104a and polarized in the vertical (RH-LH) direction, a weight member 29, an electrode plate 30 formed with a terminal 30a, and an elastic bush 31, which are all stacked in order. The elastic bush 31 is supported by a sensor casing 51, and these stacked elements 102, 104, 29, 30 and 31 are all molded by a molding material 53 within the sensor casing 51 for supporting and waterproofing the sensor elements.

Further, the sensor casing 51 is formed with two flange portions 51a at which the sensor casing 51 is fixed to the two vertical side flange portions 21c and 21d of the metallic gasket 21 with bolts 25.

FIG. 9E shows a side view of the sensor 100. With reference to FIGS. 9D and 9E, the distance h between the end surface of the pressure contact member 102 and that of the flange portions 51a of the sensor 100 is determined slightly smaller than the distance (e−t) obtained by subtracting a thickness t of a washer 105 from a distance e between the surface 21e of the middle extension portion 21b and that of the flange portions 21c and 21d, so that the pressure contact member 102 of the knock sensor 100 can be directly brought into pressure contact with the contact surface 21e of the middle extension portion 21b of the metallic gasket 21 under a predetermined pressure. Further, when the contact surface 21e of the extension portion 21b is polished into a fine mirror surface, it is possible to more effectively transmit knock vibration K to the knock sensor 100 through the metallic gasket 21.

When knock vibration K is generated in the combustion chamber 5, the generated knock vibration K is transmitted through the middle extension portion 21b of the metallic gasket 21 with high vibration transmissibility to vibrate the piezoelectric element 104 in the polarized direction 104b via the pressure contact member 102, so that a sensor voltage can be outputted through the terminal 30a. Further, the other terminal of the knock sensor 100 is grounded to the engine body via the gasket 21. Further, in this embodiment, since the knock sensor 100 is fixed to the gasket 21 via two washers 105 and 106 with lower vibration transmissibility sandwiched between the flange portions 51a of the sensor casing 51 and the vertical flange portions 21c and 21d of the gasket 21, it is possible to more effectively detect knock vibration by the sensor 100 via the gasket 21 without being subjected to the influence of vibration of the knock sensor 100.

As described above, in the knock sensing apparatus according to the present invention, since a metallic head gasket with high vibration transmissibility is sandwiched between the cylinder block and the cylinder head and further the knock sensor is fixed to the metallic head gasket, it is possible to detect knock at higher sensitivity, because knock vibration of the cylinder block can be effectively transmitted from plural combustion chambers to the knock sensor via the metallic head gasket preferably in the form of longitudinal vibration waves, without vibration attenuation and without being subjected to the influence of difference in distance between the knock sensor and each engine cylinder of a multicylinder engine.

What is claimed is:

1. A knock sensing apparatus for detecting knock vibration of an engine including a cylinder block and a cylinder head, comprising:
   (a) a metallic head gasket having a high vibration transmissibility and tightly sandwiched between the cylinder block and the cylinder head;
   (b) knock sensing means fixed to said metallic head gasket at about a middle portion of the cylinder block, for uniformly sensing longitudinal waves of knock vibration of the engine transmitted from cylinders formed in the cylinder block through said metallic head gasket along a flat plane direction of said metallic head gasket; and
   (c) knock detecting circuit means connected to said knock sensing means, for detecting presence or absence of engine knock vibration in response to an output signal of said knock sensing means.

2. The knock sensing apparatus of claim 1, wherein said metallic head gasket is formed of stainless steel.

3. The knock sensing apparatus of claim 2, wherein said metallic head gasket is formed with a flat portion.

4. The knock sensing apparatus of claim 3, wherein said metallic head gasket further comprises an auxiliary metallic plate made of metal with higher transmissibility than that of stainless steel and placed on the flat portion of said metallic head gasket.

5. The knock sensing apparatus of claim 4, wherein said metallic head gasket further comprises a first nonmetallic elastic plate placed on said auxiliary metallic plate.

6. The knock sensing apparatus of claim 5, wherein said metallic head gasket further comprises two nonmetallic elastic plates placed so as to sandwich the flat portion of said metallic head gasket and said auxiliary metallic plate.

7. The knock sensing apparatus of claim 4, wherein said auxiliary metallic plate is formed of brass.

8. The knock sensing apparatus of claim 6, wherein said nonmetallic elastic plates are made of silicon rubber.

9. The knock sensing apparatus of claim 1, wherein said knock sensing means comprises:
   (a) a base plate placed on said metallic head gasket;
   (b) a piezoelectric element placed on said base plate, for sensing knock vibration transmitted through said metallic head gasket;
   (c) a weight member placed on said piezoelectric element;
   (d) an electrode placed on said piezoelectric element;
   (e) an elastic bush placed on said electrode; and
   (f) a casing for fixing said base plate, piezoelectric element, weight member and elastic bush to said metallic head gasket so that said piezoelectric element is brought into pressure contact with said base plate.

10. The knock sensing apparatus of claim 1, wherein said knock sensing means comprises:
   (a) a pressure contact member brought into pressure contact with said metallic head gasket;
   (b) a piezoelectric element placed on said pressure contact member, for sensing knock vibration transmitted through said metallic head gasket;
   (c) a weight member placed on said piezoelectric element;
   (d) an electrode placed on said piezoelectric element;
   (e) an elastic bush placed on aid electrode; and
   (f) a casing for fixing said pressure contact member, piezoelectric element, weight member and elastic bush to said metallic head gasket so that said piezoelectric element is brought into pressure contact with said pressure contact member.

11. The knock sensing apparatus of claim 10, wherein said pressure contact member, said piezoelectric element, said weight member, said electrode and said elastic bush are all molded together by a molding material within said casing.

12. The knock sensing apparatus of claim 11, wherein the molding material is a silicon rubber.

13. The knock sensing apparatus of claim 1, wherein said knock sensing means is arranged to detect knock vibration generated in the longitudinal direction of the engine.

14. The knock sensing apparatus of claim 1, wherein said knock sensing means is arranged to detect knock vibration generated in the transverse direction of the engine.

15. A knock sensing apparatus for detecting knock vibration of an engine including a cylinder block and a cylinder head, comprising:
   (a) a metallic head gasket having a high vibration transmissibility and tightly sandwiched between the cylinder block and the cylinder head, said head gasket having an elastic element formed by a flat portion and an inner folded portion;
   (b) knock sensing means fixed to said metallic head gasket, for sensing knock vibration of the engine;
   (c) knock detecting circuit means connected to said knock sensing means, for detecting presence or absence of engine knock vibration in response to an output signal of said knock sensing means.

16. The knock sensing apparatus of claim 15, wherein said metallic head gasket further comprises an auxiliary metallic plate made of metal with higher transmissibility than that of stainless steel and placed on the flat portion of said metallic head gasket at a remaining area other than the inner folded portion so as to be flush with the inner folded portion when tightly sandwiched between the cylinder block and the cylinder head.

17. The knock sensing apparatus of claim 16, wherein said metallic head gasket further comprises a first nonmetallic elastic plate placed on said auxiliary metallic plate.

18. The knock sensing apparatus of claim 17, wherein said metallic head gasket further comprises a second nonmetallic elastic plate placed so as to sandwich the flat portion of said metallic head gasket and said auxiliary metallic plate between said first and second nonmetallic elastic plates.

19. The knock sensing apparatus of claim 16, wherein said auxiliary metallic plate is formed of brass.

20. The knock sensing apparatus of claim 18, wherein said nonmetallic elastic plates are made of silicon rubber.

21. The knock sensing apparatus of claim 15, wherein said knock sensing means is attached at substantially middle position of the cylinder block to uniformly sense knock vibration from plural cylinders formed in the cylinder block.

22. The knock sensing apparatus of claim 15, wherein said knock sensing means senses a longitudinal wave of knock vibration transmitted along a flat plane direction of said metallic head gasket.

* * * * *